(12) United States Patent
Tvete et al.

(10) Patent No.: US 8,875,644 B2
(45) Date of Patent: Nov. 4, 2014

(54) SHIP'S FORE BODY FORM

(75) Inventors: Magnus Ragnvald Tvete, Fredrikstad (NO); Henning Borgen, Alesund (NO)

(73) Assignee: Vard Design AS, Alesund (NO)

(*) Notice: Subject to any disclaimer, the term of this patent is extended or adjusted under 35 U.S.C. 154(b) by 0 days.

(21) Appl. No.: 13/146,348

(22) PCT Filed: Jan. 27, 2010

(86) PCT No.: PCT/NO2010/000030
§ 371 (c)(1),
(2), (4) Date: Nov. 9, 2011

(87) PCT Pub. No.: WO2010/087717
PCT Pub. Date: Aug. 5, 2010

(65) Prior Publication Data
US 2012/0048164 A1 Mar. 1, 2012

(30) Foreign Application Priority Data
Jan. 27, 2009 (NO) .................................. 20090398

(51) Int. Cl.
*B63B 1/00* (2006.01)
*B63B 1/06* (2006.01)
(52) U.S. Cl.
CPC . *B63B 1/06* (2013.01); *Y02T 70/126* (2013.01)
USPC ...................................................... 114/61.28
(58) Field of Classification Search
USPC ................................ 114/56.1, 57, 67.1, 61.28
See application file for complete search history.

(56) References Cited

U.S. PATENT DOCUMENTS

| 3,946,687 | A | * | 3/1976 | Taylor et al. | 114/61.28 |
| 4,359,010 | A | * | 11/1982 | Inui | 114/57 |
| 4,550,673 | A | * | 11/1985 | Ingvason | 114/61.28 |
| 4,658,746 | A | * | 4/1987 | Ingvason | 114/61.28 |
| 5,280,761 | A | * | 1/1994 | Karafiath et al. | 114/61.28 |
| 5,711,239 | A | * | 1/1998 | Ramde | 114/61.26 |

FOREIGN PATENT DOCUMENTS

| DE | 2353265 B1 | 2/1975 |
| DE | 3224390 A1 | 1/1984 |
| EP | 0803432 A2 | 10/1997 |
| FR | 2671776 A1 | 7/1992 |
| GB | 1033968 A | 6/1966 |
| JP | 58076383 A | 5/1983 |
| JP | 59026386 A | 2/1984 |

(Continued)

OTHER PUBLICATIONS

Patent Abstracts of Japan, Publication No. 58-076383, mailed May 9, 1983, 1 page.

(Continued)

*Primary Examiner* — Lars A Olson
*Assistant Examiner* — Jovon Hayes
(74) *Attorney, Agent, or Firm* — Osha Liang LLP

(57) ABSTRACT

A fore body of a ship has a bow having an upper bow portion, a lower bow portion, and a recessed bow portion between the upper bow portion and the lower bow portion. The recessed bow portion has a blunt shaped surface, curving inwards and backwards from a transition area between the upper bow portion and the recessed bow portion. The blunt shaped surface is designed to reflect smaller waves to reduce added wave resistance in smaller waves which are reflected in the recessed bow portion.

20 Claims, 8 Drawing Sheets

(56) References Cited

FOREIGN PATENT DOCUMENTS

| JP | 8-239082 A | 9/1996 |
|---|---|---|
| JP | 2000142553 A | 5/2000 |
| JP | 2006111045 A | 4/2006 |
| JP | 2008-201185 A | 9/2008 |

OTHER PUBLICATIONS

Patent Abstracts of Japan, Publication No. 2008-201185, dated Sep. 4, 2008, 1 page.

International Search Report issued in PCT/NO2010/000030, mailed Apr. 12, 2011, 4 pages.

Written Opinion issued in PCT/NO2010/000030, mailed Apr. 12, 2011, 4 pages.

Norwegian Search Report issued in Norwegian Patent Application No. 20090398, 1 page.

Chinese Office Action Issued in Chinese Application No. 2010800056717; Dated: Jul. 31, 2013 (10 Pages With English Translation).

English Patent Abstract of JP 8-239082 from esp@cenet, Publication Date: Sep. 17, 2996 (1 Page).

Norwegian Search Report Issued in Application No. 20090398, Dated: Feb. 19, 2013 (1 Page).

* cited by examiner

32

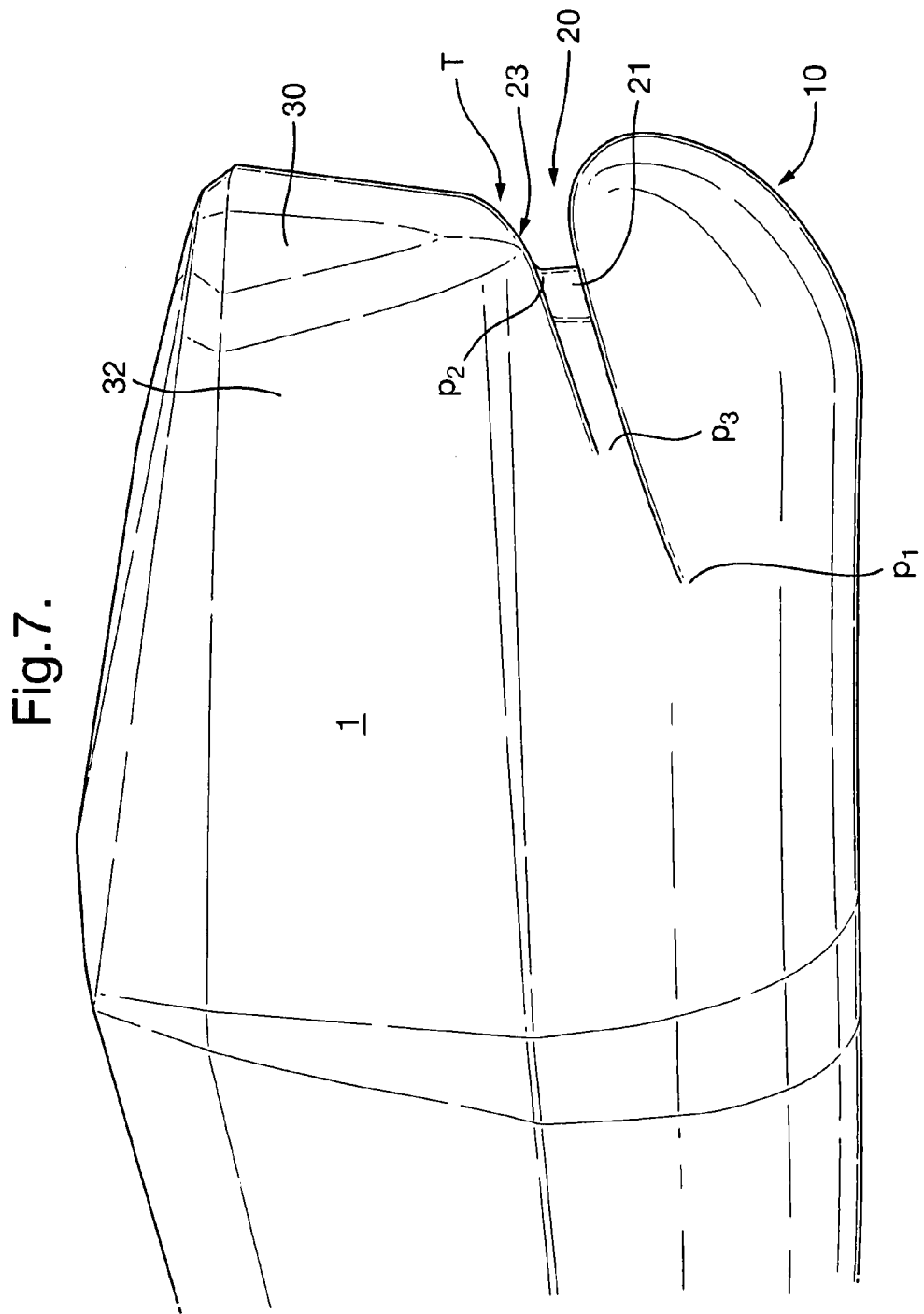

SHIP'S FORE BODY FORM

BACKGROUND

1. Field of the invention

The invention concerns design of vessel hulls. More specifically, the invention concerns the shape of ships' fore body forms.

2. Related Art

When a ship is moving in—and relative to—water, it is subjected to various forms of resistance by the water. This is discussed by O. M. Faltinsen, *Sea Loads on Ships and Offshore Structures*, Cambridge, 1990.

The resistance components in various conditions can be summarized as follows:
calm water resistance, when there are no waves,
added resistance in short (small) waves, and
added resistance in long waves (higher seastates).

Most important is the total resistance, which is a combination of calm water resistance and the added component due to the waves.

Thus, the added resistance due to waves is usually divided into two components:
a) added resistance due to reflection of waves in the bow region of the ship, and
b) added resistance due to ship motions.

The wave length regions where the different components dominate are shown in FIG. 1, illustrating typical wave length ($\lambda$) dependence of added resistance in waves for a ship of length "L". The figure shows the two components of resistance increase, as well as the total resistance increase.

Typically, added resistance due to bow wave reflection dominate when the wave length $\lambda$ is less than half the ship length ($\lambda/L<0.5$), while the added resistance due to ship motions are dominant when the ship motions become large. This is typically in the region $0.7<\lambda/L<1.5$, where the wave length is close to the length of the ship.

When a ship goes in a seaway, the waves induce motions in six degrees of freedom on the hull. From a resistance point of view, the heave and pitch motions are the most important, which again are strongly coupled. When the hull heaves and pitches it generates its own wave system, which carries energy away in much the same way as the still water wave pattern and thereby creating a resistance force.

The added resistance in small waves is due to bow wave reflection (cf. FIG. 1), which again is very dependent on bow shape geometry and forward speed. The ship has very little, or none, motions in these waves as the ship motions are dominated by the inertia forces in this frequency range.

In order to design an effective bow to minimize the calm water resistance and the added resistance in waves, knowledge of the most probable sea conditions, wave heading, speed and operational profile is required.

SUMMARY

One or more embodiments of the present invention achieves a bow shape whereby the added resistance in both small and large waves is reduced, as well as reducing the level of accelerations, motions in a seaway and slamming in the bow region. As a result, the vessel can be operated with less fuel consumption and more comfort for the crew, compared to that of a conventional bow shape. One or more embodiments of the present invention comprises a conventional bulbous bow design for low calm water resistance.

The bow hull shape according to one or more embodiments of the present invention comprises three distinct portions, each dealing with the three different resistance regimes, and a combination of these:

A lower bow portion: Optimised for calm water with a conventional bulbous bow with low calm water resistance.

An intermediate bow portion: Optimised to reduce the added wave resistance in smaller waves which are reflected in the bow part region. The energy of the wave is treated in a relatively short period of time and the tendency for the small waves to follow the hull shape further aft is generally prevented.

An upper bow portion: Optimised to reduce the added wave resistance in larger waves which are mainly due to ship motions. By stretching this part further forward (relative to a conventional bow shape) and make it more pointing, it will split the biggest waves and make it possible to reduce the flare angles and the "shoulders" in the bow region.

The fore body of a ship according to one or more embodiments of the present invention comprises a bow having an upper bow portion and a lower bow portion, characterised by a recessed bow portion between the upper bow portion and the lower bow portion.

Advantageously, the recessed bow portion comprises a blunt shaped surface, curving inwards and backwards from a transition area between the upper bow portion and the recessed bow portion, said blunt shaped surface being designed to reflect smaller waves and thus reduce the added wave resistance in smaller waves which are reflected in the recessed bow portion, whereby the energy of the wave is treated in a relative short period of time and the tendency for the small waves to follow the hull shape further aft is generally prevented.

In one or more embodiments of the present invention, the recessed bow portion comprises a generally vertically oriented leading edge portion, extending in a z-direction from the blunt shaped surface and down to the lower bow portion.

In one or more embodiments of the present invention, the upper bow portion comprise reduce flare angles and a comparably narrow shoulder portion, whereby the added wave resistance in larger waves is reduced.

In one or more embodiments of the present invention, the upper bow portion extends beyond the lower bow portion in the forward x-direction. In one or more embodiments of the present invention, the lower bow portion extends beyond the upper bow portion in the forward x-direction.

In one or more embodiments of the present invention, the lower bow portion comprises a bulbous bow portion.

BRIEF DESCRIPTION OF THE DRAWINGS

FIG. 7 is a perspective view of a bow design according to one or more embodiments of the invention.

DETAILED DESCRIPTION

Hereafter, embodiments of the invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In the following description, spatial coordinates and directions are made with reference to a conventional three-dimensional coordinate system where the ship length direction, width direction and height direction correspond respectively to the x-axis, y-axis and z-axis of the coordinate system, and wherein the x-axis and the y-axis are oriented in the horizontal plane while the z-axis is oriented in the vertical plane. The forward direction of the ship corresponds to the positive x-direction and the upward direction corresponds to the positive z-direction. The xz-plane defines a longitudinal plane and the yz-plane defines a transversal plane.

With reference to the attached drawings, a ship fore body 1 according to one or more embodiments of the present invention comprises a bow having an upper bow portion 30 and a lower bow portion 10 and a recessed bow portion 20 between the upper bow portion 30 and the lower bow portion 10.

Figure 2:
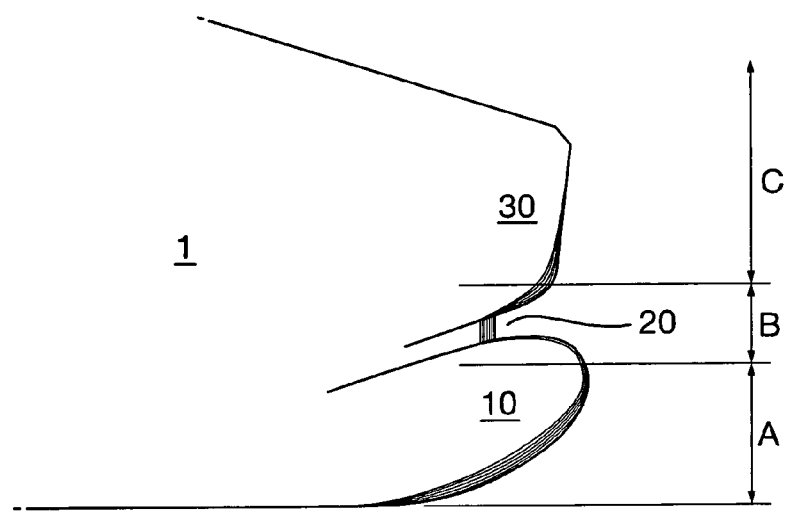
FIG. 2 is a principle side view of a bow design according to one or more embodiments of the invention.

Referring to FIG. 2, these three bow portions are schematically illustrated. By virtue of this design, three zones may be defined:

Zone A: Low calm water resistance zone, in which the operative element is the lower, bulbous bow portion 10;

Zone B: Small wave crushing zone, in which the operative element is the intermediate, recessed and blunt bow portion 20; and Zone C: Larger wave splitting zone, in which the operative element is the comparably narrow upper bow portion 30, having a shape which efficiently splits the larger waves.

Figure 3:
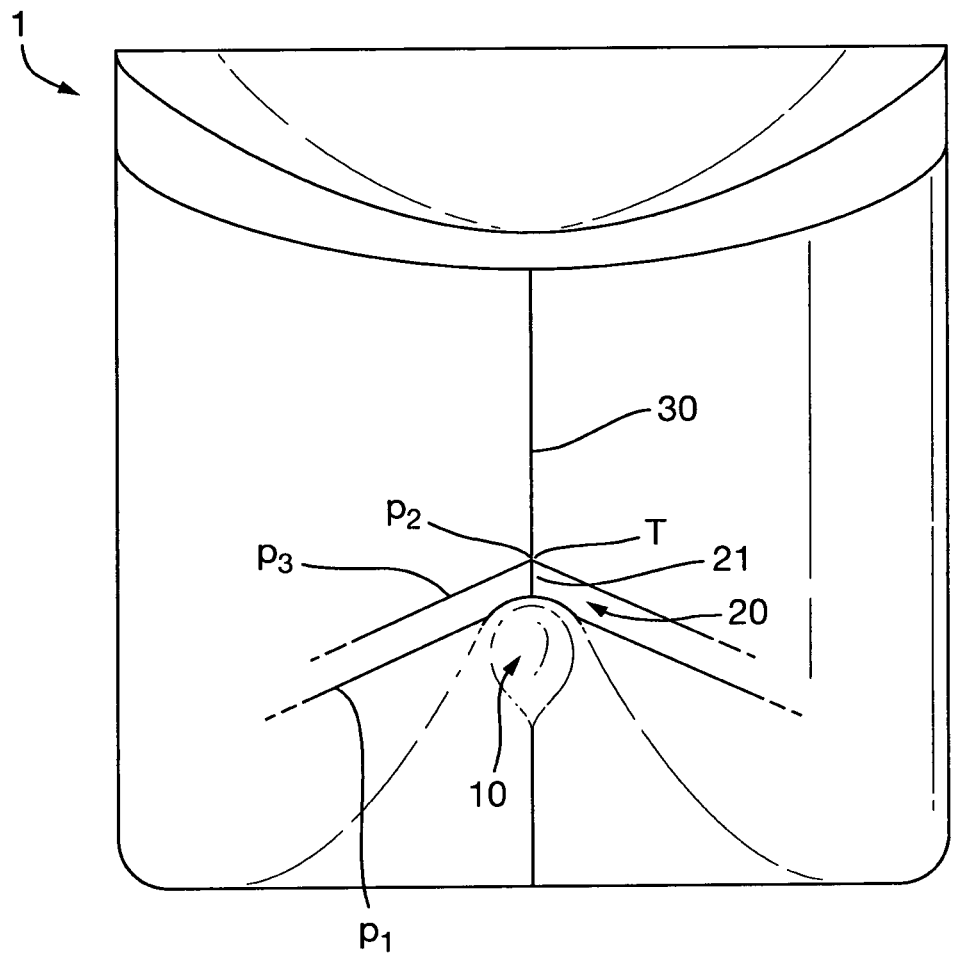
FIG. 3 is a front view of a bow design according to one or more embodiments of the invention, viewed in the ship longitudinal direction.
Figure 5A:
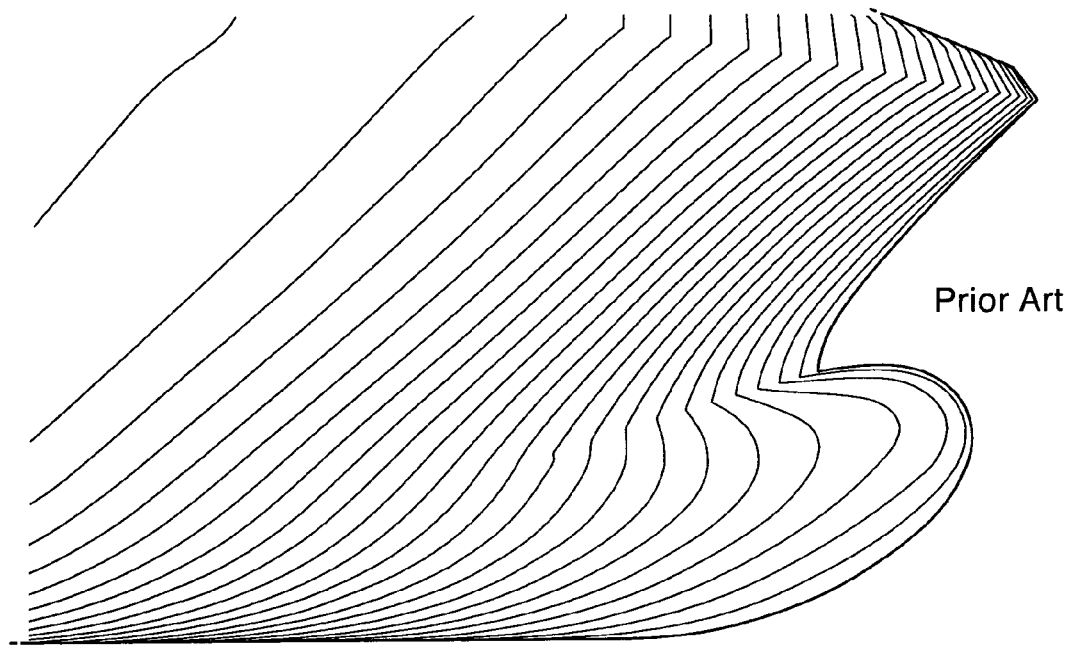
FIG. 5a is a line drawing of a conventional bow design, viewed in the ship transverse direction (y axis), from a side.
Figure 5B:
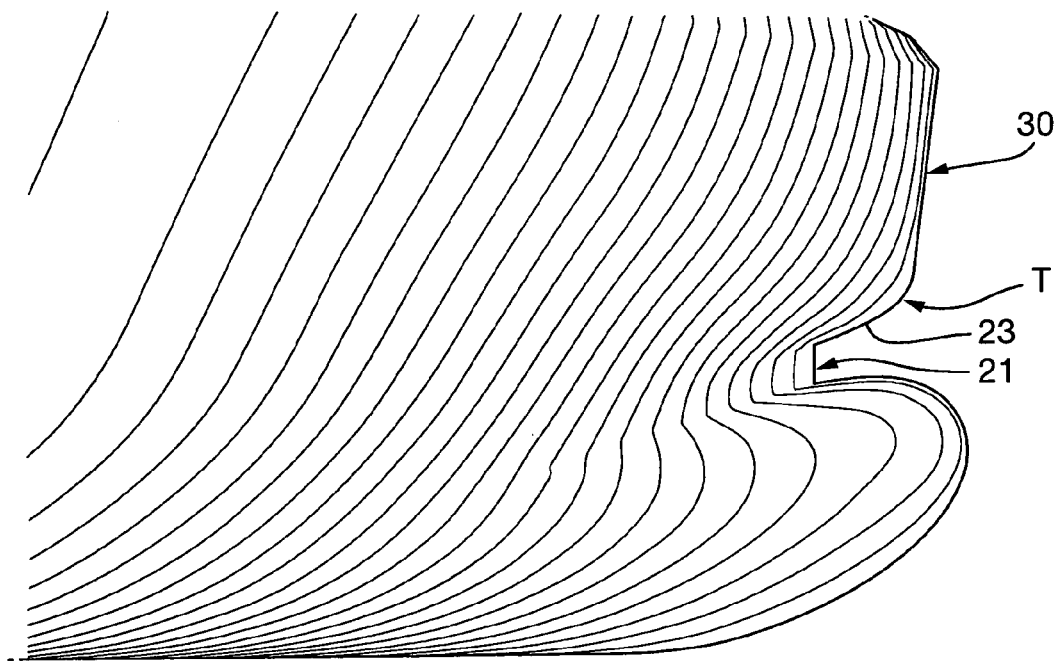
FIG. 5b is a line drawing of a bow design according to one or more embodiments of the invention, viewed in the ship transverse direction (y axis), from a side.
Figure 6A:
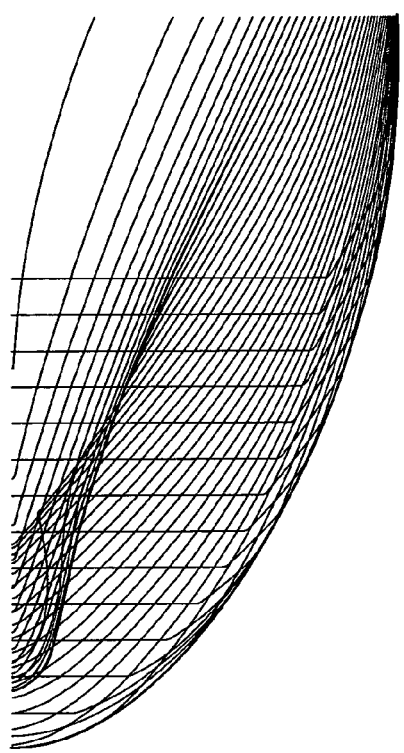
FIG. 6a is a line drawing of a conventional bow design, viewed in the ship transverse direction (z axis), from below.
Figure 6B:
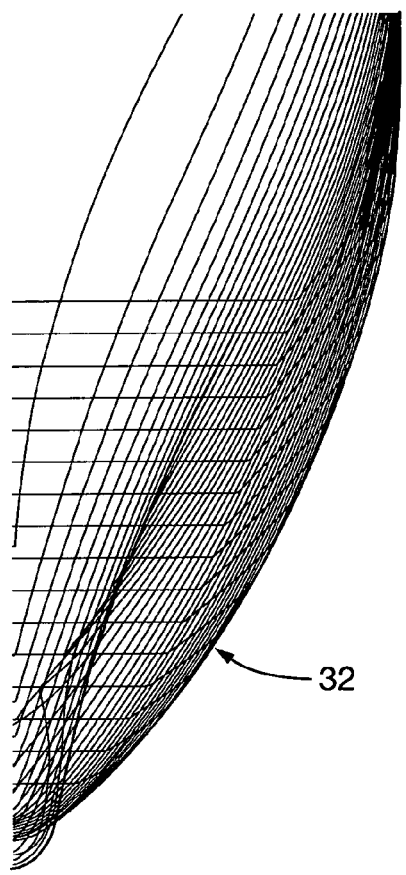
FIG. 6b is a line drawing of a bow design according to one or more embodiments of the invention, viewed in the ship transverse direction (z axis), from below.
Figure 8:
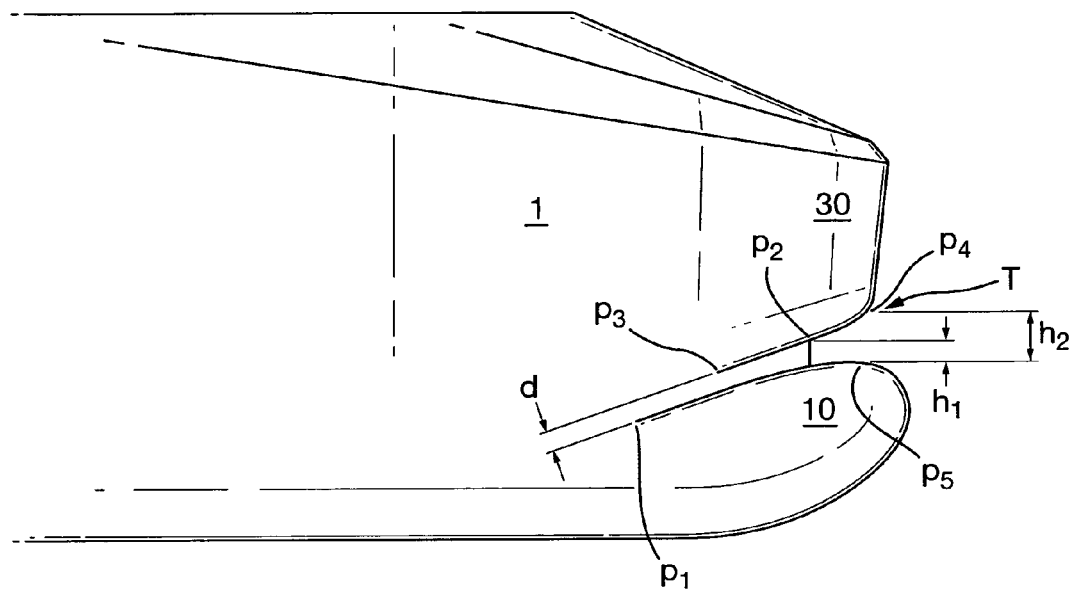
FIG. 8 is a side view of a bow design according to one or more embodiments of the invention.
Figure 9:
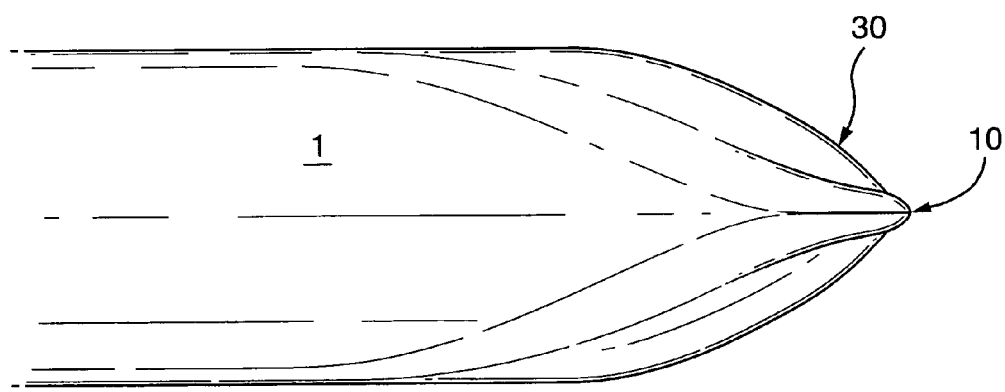
FIG. 9 is a plan view of a bow design according to one or more embodiments of the invention, viewed from below.
Figure 10:
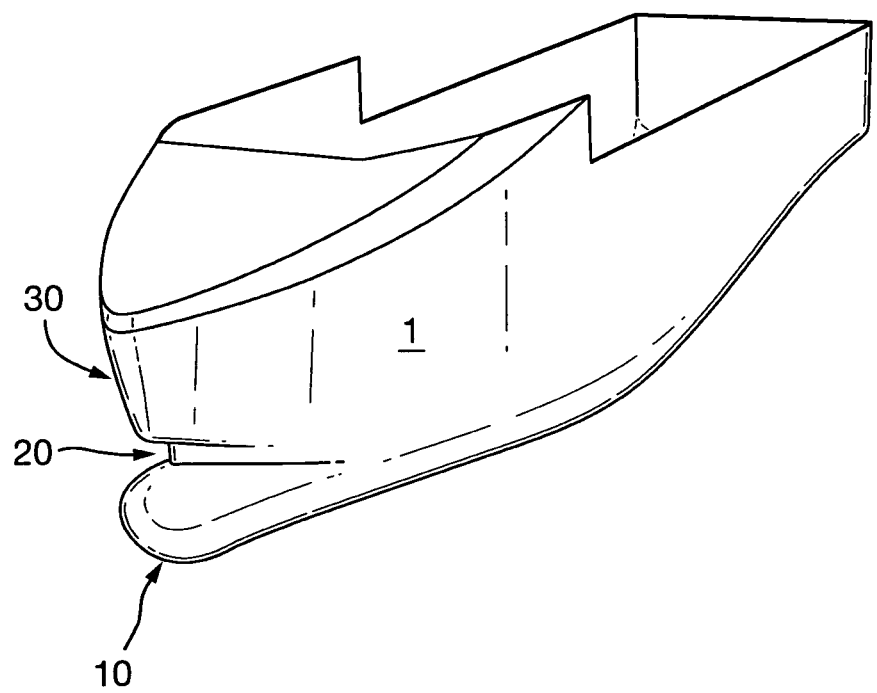
FIG. 10 is another perspective view of a bow design according to one or more embodiments of the invention.

In the novel bow shape the recessed bow portion 20 may be defined as the surface extending from a transition area T between recessed bow portion and the upper bow portion, as illustrated in e.g. FIGS. 3, 5B and 7. As can be seen from the figures, a blunt shaped surface 23, extends from the transition area T and curves inwards and backwards, in a manner of speaking "underneath" the upper bow portion 30.

This blunt shaped surface 23 will reflect smaller waves and thus reduce the added wave resistance.

Also, the recessed bow portion comprises a generally vertically oriented leading edge portion 21, which in the illustrated embodiment extends in a z-direction, from the blunt shaped surface 23 and down to the lower bulbous bow portion 10.

Figure 4A:
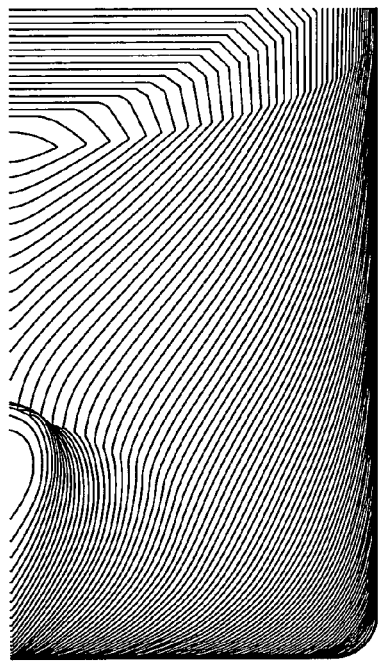
FIG. 4*a* is a line drawing of a conventional bow design, viewed in the ship longitudinal direction (x axis), from the front.
Figure 4B:
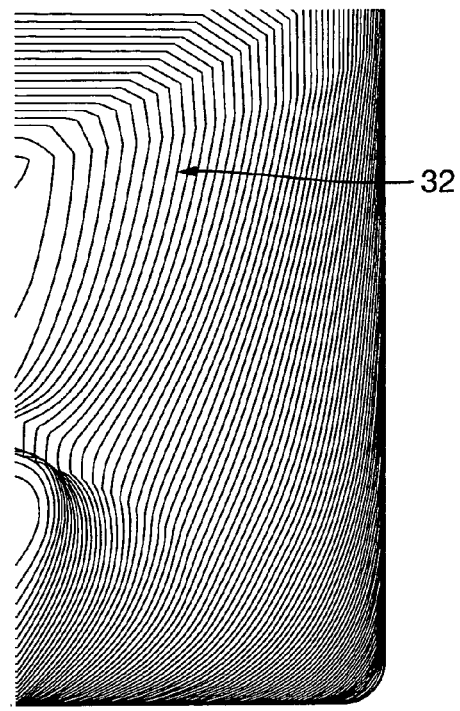
FIG. 4*b* is a line drawing of a bow design according to one or more embodiments of the invention, viewed in the ship longitudinal direction (x axis), from the front.

As can be seen particularly from FIG. 4B, the upper bow portion 30 comprise reduce flare angles and a comparably narrow shoulder portion 32, compared to the conventional device (cf. FIG. 4A). This feature contributes to reducing the added wave resistance in larger waves.

Figure 1:
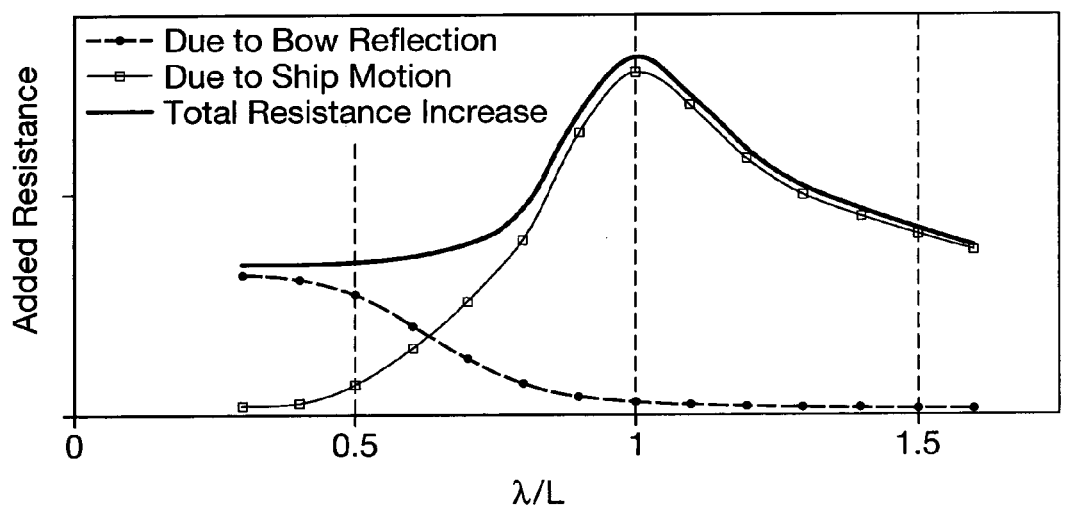
FIG. 1 is a graph showing typical wave length dependence of added resistance in waves.

Referring to FIG. 1, according to one or more embodiments of the present invention, the added resistance is lowered, compared to a bow design according to conventional devices, particularly in the left-hand part of the graph as the added resistance due to bow reflection is lowered.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A fore body of a ship comprising:
   a bow having an upper bow portion, and a lower bow portion, and
   a recessed bow portion between the upper bow portion and the lower bow portion,
   wherein the recessed bow portion comprises a blunt shaped surface, curving inwards and backwards from a transition area between the upper bow portion and the recessed bow portion, and
   wherein said blunt shaped surface is designed to reflect shorter waves to reduce added wave resistance in shorter waves which are reflected in the recessed bow portion, whereby energy of a wave is treated in a relatively short period of time and a tendency of the short wave to follow a hull shape further is generally prevented.

2. The fore body of claim 1, wherein the recessed bow portion comprises a generally vertically oriented leading edge portion.

3. The fore body of claim 2, wherein the leading edge portion extends in a z-direction.

4. The fore body of claim 2, wherein the leading edge portion extends from the blunt shaped surface and down to the lower bow portion.

5. The fore body of claim 1, wherein the upper bow portion comprises reduce flare angles and a shoulder portion, whereby the added wave resistance in larger waves is reduced.

6. The fore body of claim 1, wherein the upper bow portion extends beyond the lower bow portion in the forward x-direction.

7. The fore body of claim 1, wherein the lower bow portion extends beyond the upper bow portion in the forward x-direction.

8. The fore body of claim 1, wherein the lower bow portion comprises a bulbous bow portion.

9. The fore body of claim 3, wherein the leading edge portion extends from the blunt shaped surface and down to the lower bow portion.

10. The fore body of claim 1, wherein the upper bow portion comprises reduce flare angles and a comparably narrow shoulder portion, whereby the added wave resistance in larger waves is reduced.

11. The fore body of claim 3, wherein the upper bow portion comprises reduce flare angles and a comparably narrow shoulder portion, whereby the added wave resistance in larger waves is reduced.

12. The fore body of claim 4, wherein the upper bow portion comprises reduce flare angles and a comparably narrow shoulder portion, whereby the added wave resistance in larger waves is reduced.

13. The fore body of claim 2, wherein the upper bow portion extends beyond the lower bow portion in the forward x-direction.

14. The fore body of claim 3, wherein the upper bow portion extends beyond the lower bow portion in the forward x-direction.

15. The fore body of claim 4, wherein the upper bow portion extends beyond the lower bow portion in the forward x-direction.

16. The fore body of claim 5, wherein the upper bow portion extends beyond the lower bow portion in the forward x-direction.

17. The fore body of claim 2, wherein the lower bow portion extends beyond the upper bow portion in the forward x-direction.

18. The fore body of claim 3, wherein the lower bow portion extends beyond the upper bow portion in the forward x-direction.

19. The fore body of claim 4, wherein the lower bow portion extends beyond the upper bow portion in the forward x-direction.

20. The fore body of claim 5, wherein the lower bow portion extends beyond the upper bow portion in the forward x-direction.

* * * * *